(12) United States Patent
Ohkuma et al.

(10) Patent No.: US 9,054,398 B2
(45) Date of Patent: Jun. 9, 2015

(54) COOLING STRUCTURE FOR BATTERIES AND ELECTRICAL UNITS

(75) Inventors: Kanae Ohkuma, Utsunomiya (JP); Koichi Hasegawa, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1052 days.

(21) Appl. No.: 12/099,554

(22) Filed: Apr. 8, 2008

(65) Prior Publication Data
US 2008/0251246 A1 Oct. 16, 2008

(30) Foreign Application Priority Data
Apr. 13, 2007 (JP) .................................. 2007-105727

(51) Int. Cl.
| | | |
|---|---|---|
| H01M 10/48 | (2006.01) | |
| H01M 10/50 | (2006.01) | |
| G05D 23/00 | (2006.01) | |
| H01M 10/613 | (2014.01) | |
| H01M 10/60 | (2014.01) | |
| H01M 10/65 | (2014.01) | |
| B60K 1/04 | (2006.01) | |
| B60L 11/18 | (2006.01) | |
| G05D 23/19 | (2006.01) | |
| H01M 10/625 | (2014.01) | |
| H01M 10/633 | (2014.01) | |
| H01M 10/6563 | (2014.01) | |
| H01M 10/6566 | (2014.01) | |
| B60K 1/00 | (2006.01) | |

(52) U.S. Cl.
CPC .......... *H01M 10/5004* (2013.01); *H01M 10/50* (2013.01); *H01M 10/5034* (2013.01); *B60K 1/04* (2013.01); *B60K 2001/005* (2013.01); *B60K 2001/0433* (2013.01); *B60L 11/1874* (2013.01); *B60L 2240/525* (2013.01); *G05D 23/1932* (2013.01); *H01M 10/486* (2013.01); *H01M 10/5016* (2013.01); *H01M 10/5022* (2013.01); *H01M 10/5067* (2013.01); *H01M 10/5073* (2013.01); *Y02T 10/7005* (2013.01); *Y02T 10/705* (2013.01)

(58) Field of Classification Search
None
See application file for complete search history.

(56) References Cited

U.S. PATENT DOCUMENTS

| | | | | |
|---|---|---|---|---|
| 6,340,877 | B1 * | 1/2002 | Mita et al. ...................... | 320/112 |
| 7,102,310 | B2 * | 9/2006 | Ishishita ....................... | 318/268 |
| 2006/0056142 | A1 * | 3/2006 | Takahashi et al. ............. | 361/683 |
| 2007/0040418 | A1 * | 2/2007 | Ohkuma et al. ................ | 297/15 |

FOREIGN PATENT DOCUMENTS

| | | | |
|---|---|---|---|
| FR | 2745422 | * | 8/1997 |
| JP | 7-156826 A | | 6/1995 |
| JP | 11-180168 A | | 7/1999 |
| JP | 2000-040535 | | 2/2000 |
| JP | 2000-100481 | | 4/2000 |
| JP | 2005-019231 | | 1/2005 |
| JP | 2005-183217 A | | 7/2005 |
| JP | 2006-273191 | | 10/2006 |
| JP | 2007-008403 | | 1/2007 |

OTHER PUBLICATIONS

JP 2007-105727, Office Action, mailed Sep. 20, 2011.

* cited by examiner

*Primary Examiner* — Ladan Mohaddes
(74) *Attorney, Agent, or Firm* — Westerman, Hattori, Daniels & Adrian, LLP (57) ABSTRACT

A cooling structure for batteries and electrical units, that cools the batteries being driving sources of a motor mounted in a vehicle capable of traveling by a driving force of the motor and electrical units for driving the motor, the cooling structure including: a plurality of battery boxes that each contain one of the batteries; cooling passages that are each formed in each of the battery boxes, through which cooling air flows; a merging part where downstream ends of the cooling passages of the battery boxes are merged with each other; and cooling portions of the electrical units, that are provided on a downstream side of the merging part, wherein the electrical units are disposed on a downstream side of the battery boxes.

11 Claims, 9 Drawing Sheets

COOLING STRUCTURE FOR BATTERIES AND ELECTRICAL UNITS

BACKGROUND OF THE INVENTION

Priority is claimed on Japanese Patent Application No. 2007-105727, filed on Apr. 13, 2007, the content of which is incorporated herein by reference.

1. Field of the Invention

The present invention relates to a cooling structure for batteries and electrical units.

2. Description of Related Art

A vehicle, which depends on a motor to obtain the entire driving force for traveling or a part of a driving force for traveling, such as an electric vehicle, a fuel cell vehicle, and a hybrid vehicle, is provided with a battery for driving the motor or high-voltage electrical units such as a drive circuit of the motor. Since the battery or the electrical units generate heat due to the characteristics thereof, the battery or the electrical units need to be cooled. In particular, the output performance of the battery of them significantly is affected by temperature. For this reason, the cooling of the battery is important to both the driving force of the motor and the traveling performance of a vehicle.

There has been the following structure as a cooling structure for a battery or high-voltage electrical units. In a casing of the structure, a battery is disposed on an upstream portion of the casing, and electrical units are disposed on a downstream portion of the casing so as to be divided from one another in the width direction of a vehicle. A cooling fan is provided on the upstream side of the battery, a duct of the cooling fan is connected to the front portion of the casing, and cooling air discharge ducts are provided on the rear side of the electrical units that are disposed on the left and right sides (see Japanese Unexamined Patent Application, First Publication No. H11-180168).

Further, there has been the following assembly structure. A battery is contained in a battery box, high-voltage electrical units are disposed on a rear upper surface of the battery box, a cooling air inlet is formed at a front portion of the battery box, a cooling air outlet is formed at a rear portion of the battery box, and a cooling fan is provided on an upstream side of the outlet (see Japanese Unexamined Patent Application, First Publication No. H7-156826).

However, there have been the following problems in the related art. That is, as a voltage of an electric power source trends to be increased in the above-mentioned various vehicles, there has been a limitation on a space where the battery is contained in the form of a group. For this reason, the battery should be divided into a plurality of batteries, which is connected to one another in series, in order to be mounted. When the plurality of batteries connected to one another in series is divided and disposed, for example, in a width direction of the vehicle, temperature of each of the batteries becomes imbalanced in the width direction of the vehicle. In this case, even though the batteries are connected to one another in series, some batteries are different from the other batteries in temperature. For this reason, there are problems in that it is difficult to equally charge the batteries or it is not possible to obtain sufficient output. That is, if some batteries are different from the other batteries in temperature, appropriate charging voltages of the batteries vary during the charging of the batteries. As a result, it is not possible to sufficiently charge the batteries.

For example, in the case of Japanese Unexamined Patent Application, First Publication No. H11-180168, if the cooling air is inhibited from flowing out from one cooling air discharge duct in the width direction of the vehicle, the cooling air hardly flows out on one side. As a result, the temperature of one battery rises. If the temperature of one battery becomes significantly higher than the temperature of the other battery, temperature difference partially occurs between the batteries that are divided and disposed on the left and right sides. For this reason, it is difficult to equally charge the batteries on the left and right sides. As a result, it is not possible to ensure sufficient output of the batteries.

In order to prevent this, the following is considered: a cooling fan is provided at each of the electrical units and batteries, and the temperature of each of the electrical units and the batteries is monitored, and only required portions are cooled by the cooling fans. However, since the cooling fan should be provided at each of the equipments in this case, there is a problem in that the weight and cost are increased.

In view of the above described circumstances, the present invention has an object of providing a cooling structure for batteries and electrical units that can cool a plurality of divided batteries so as to prevent temperature difference from occurring and can effectively cool electrical units.

SUMMARY OF THE INVENTION

In order to achieve the above described object, the present invention employs the followings. Namely, the present invention employs a cooling structure for batteries and electrical units, that cools the batteries being driving sources of a motor mounted in a vehicle capable of traveling by a driving force of the motor and electrical units for driving the motor, the cooling structure including: a plurality of battery boxes that each contain one of the batteries; cooling passages that are each formed in each of the battery boxes, through which cooling air flows; a merging part where downstream ends of the cooling passages of the battery boxes are merged with each other; and cooling portions of the electrical units, that are provided on a downstream side of the merging part, wherein the electrical units are disposed on a downstream side of the battery boxes.

According to the above described cooling structure for batteries and electrical units, cooling air, which has cooled the batteries contained in the battery boxes to an optimum temperature, that is, has cooled the batteries so as to suppress temperature difference between the batteries, is merged with each other. The merged cooling air can be used to cool the electrical units. As a result, while the batteries show sufficient performance, it is possible to cool the electrical units.

It may be arranged such that the cooling structure further including cooling fans that are provided in the vicinity of the merging part.

In this case, even though the flow rate of cooling air varies at each of the batteries, it is possible to merge the cooling air from the batteries by the cooling fans and to make the cooling air be uniform. The cooling air can be used to cool the electrical units. As a result, it is possible to effectively cool the electrical units.

It may be arranged such that each of the cooling passages formed in the battery boxes is provided with one of the cooling fans.

In this case, it is possible to reliably cool the batteries in the battery boxes. As a result, it is possible to maintain the temperature condition of the batteries, of which output performance significantly depends on temperature, at optimum conditions.

It may be arranged such that each of the batteries and the electrical units is provided with a temperature detector; each of the temperature detectors detects temperature of each of the batteries and the electrical units; when the temperature of at least one of the batteries and the electrical units exceeds a predetermined threshold value, the cooling fans are driven; and when the temperature of at least one of the electrical units exceeds a predetermined threshold value for that electrical unit, the cooling fans cool the electrical units while controlling the cooling fans so that the temperature difference between the batteries is within a predetermined range.

In this case, when the electrical units need to be cooled, it is possible to cool the batteries by driving the cooling fans of the battery boxes while controlling so that the temperature difference between the batteries is kept in a predetermined range, and is possible to cool the electrical units provided on the downstream side. As a result, it is possible to minimize electric power used to drive the cooling fans.

DETAILED DESCRIPTION OF THE INVENTION

Figure 1:
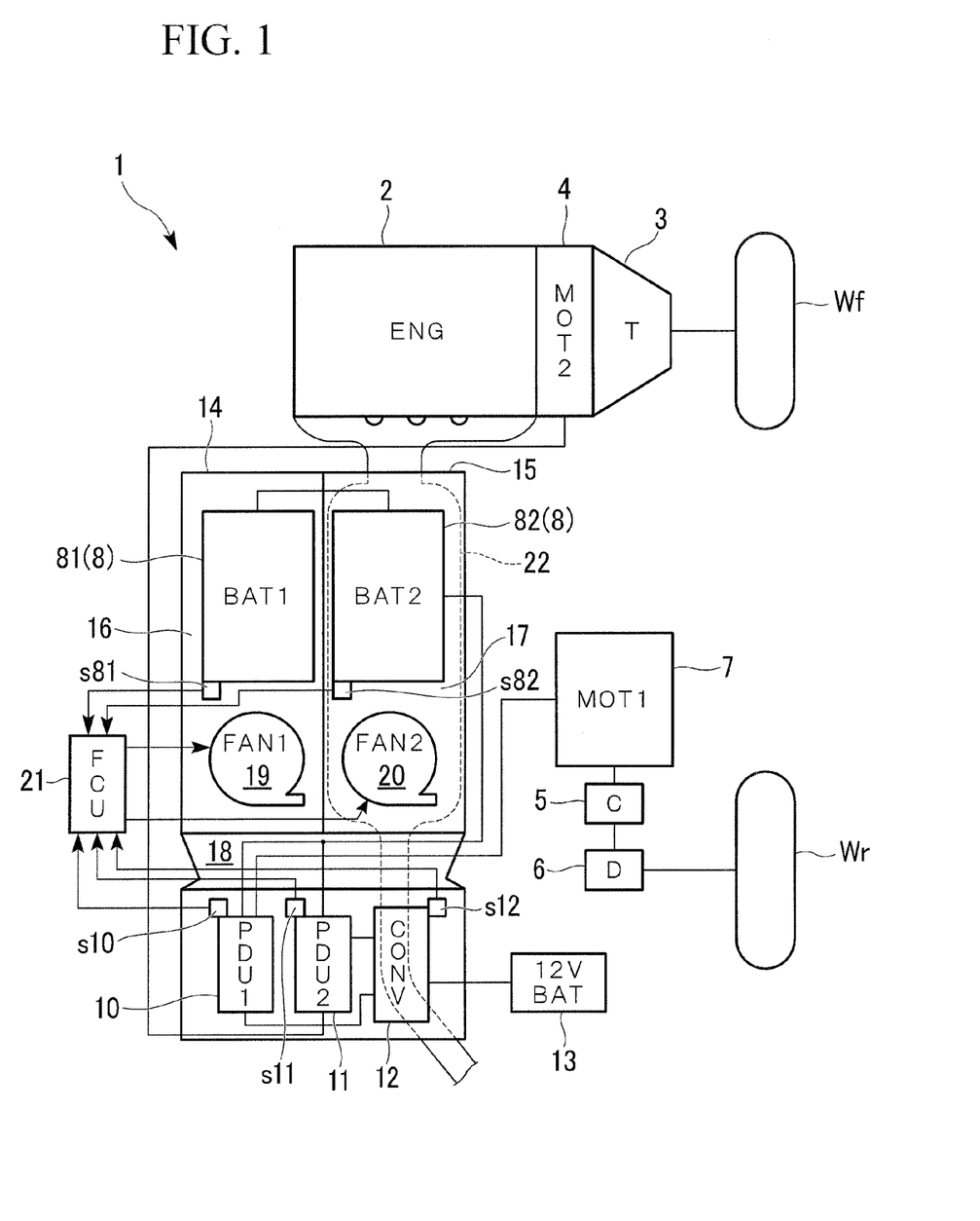
FIG. 1 is a schematic view illustrating a cooling structure for batteries and electrical units according to an embodiment of the present invention and peripheral portions of the cooling structure.
Figure 2:
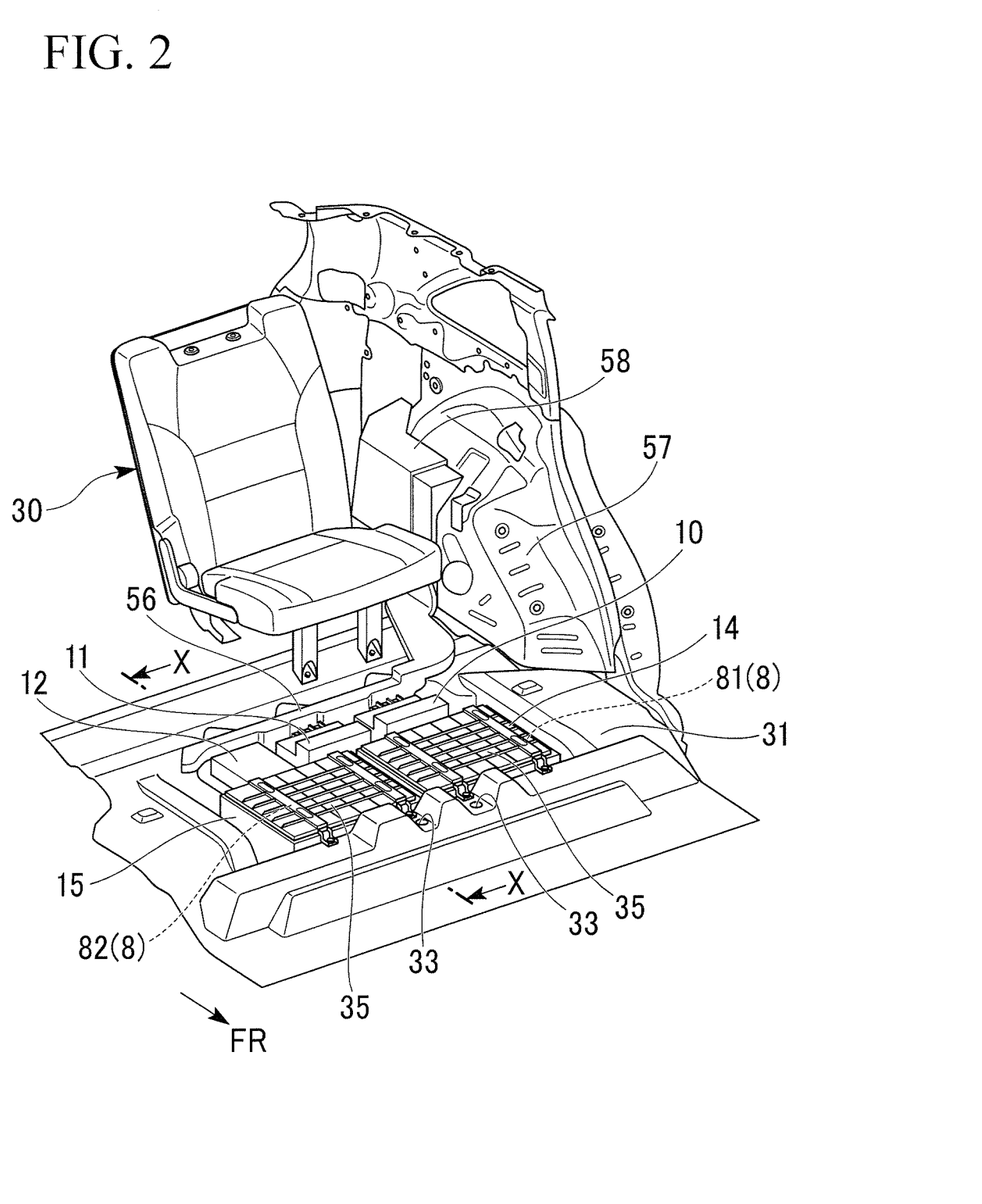
FIG. 2 is a perspective view of a rear portion of a vehicle cabin according to the embodiment.

A preferred embodiment of the present invention will be described below with reference to the drawings. As shown in FIG. 1, a cooling structure for batteries and electrical units according to this embodiment is mounted in a hybrid vehicle 1 that is an example of a vehicle capable of traveling using a driving force generated by a motor.

The hybrid vehicle 1 is a four-wheel-drive vehicle. A second motor (MOT2) 4 is provided between an engine (ENG) 2 and a transmission (T) 3. Front wheels Wf are connected to the transmission 3 by a clutch (not shown). A first motor (MOT1) 7 is connected to rear wheels Wr by a starting clutch (C) 5 and a differential (D) 6. The two motors 7 and 4 are driven by a high-voltage battery (BAT) 8 and generate driving forces. Further, the two motors 7 and 4 function as generators depending on traveling conditions, and can charge the high-voltage battery 8. Meanwhile, the transmission T may be an automatic transmission.

The first motor 7 is driven by the battery 8 through a first power drive unit (PDU1) 10 that is used as a drive circuit. The second motor 4 is also driven by the battery 8 through a second power drive unit (PDU2) 11 that is used as a drive circuit. Meanwhile, the first power drive unit 10 and the second power drive unit 11, which drive the first motor 7 and the second motor 4, are driven by control signals from a motor ECU (not shown).

Further, a converter (CONV) 12 is connected to the two motors 7 and 4. Electric power is supplied to a 12V consumption system or a 12V battery (12BAT) 13 is charged by a voltage that is dropped by the converter 12.

The battery 8 includes a plurality of modules (unit batteries) that is connected to one another in series. The battery 8 includes a large number of modules. Therefore, if the battery is formed in one group, a large space is required. For this reason, the battery 8 includes a first battery 81 and a second battery 82 that are divided from each other and connected to each other in series.

The first battery 81 and the second battery 82 are contained in a first battery box 14 and a second battery box 15, respectively. The first battery box 14 and the second battery box 15 form independent cooling passages 16 and 17 in which cooling air flows, respectively. Further, there is provided a merging part 18 where the downstream ends of the cooling passages 16 and 17 are merged with each other. A plurality of cooling fins 10F, 11F, and 12F (see FIG. 3) of the first power drive unit 10, the second power drive unit 11, and the converter 12 are disposed on the downstream side of the merging part 18 in a longitudinal direction of the vehicle.

In this case, a first cooling fan 19 and a second cooling fan 20 are provided on the upstream side of the cooling passages 16 and 17 in the vicinity of the merging part 18.

The first battery 81, the second battery 82, the first power drive unit 10, the second power drive unit 11, and the converter 12 are provided with temperature sensors s81, s82, s10, s11, and s12, respectively. The temperature sensors s81, s82, s10, s11, and s12 are connected to a fan control unit (FCU) 21. The fan control unit 21 operates the first cooling fan 19 and the second cooling fan 20 while controlling the rotation rates of the first cooling fan 19 and the second cooling fan 20 based on the detection signals of the temperature sensors s81, s82, s10, s11, and s12.

Note that, other control units may further have the functions of the fan control unit 21.

Specifically, the first battery 81 and the second battery 82 are connected to each other in series. Accordingly, if the temperature difference between the first and second batteries reaches a predetermined temperature or more, it is not possible to equally charge the batteries.

Ideally, the temperatures of the first battery 81 and the second battery 82 are equal to each other. In this case, the first cooling fan 19 and the second cooling fan 20 may be operated at the same number of revolutions. However, for example, the temperature of the second battery 82 actually becomes higher than that of the first battery 81 due to external factors such as a fact that a muffler 22 is provided below a rear floor of the second battery box 15.

Therefore, the first cooling fan 19 and the second cooling fan 20 are controlled so as to be operated at the respective rotation rates corresponding to the actual temperatures of the first battery 81 and the second battery 82, which are detected by the respective temperature sensors s81 and s82.

The actual disposition of the equipment will be described below. The front portion of the vehicle is indicated by FR in the following description.

As shown in FIGS. 2 to 5, a storage recess 32 is formed under a rear floor 31 in front of a left rear seat 30 at the rear portion of the hybrid vehicle 1. A front edge of the storage recess 32 is formed in the concave-convex shape in a width direction of the vehicle, and the concave portions of the front edge form air inlets 33. The first battery box 14 and the second battery box 15 are disposed on the front portion in the storage recess 32 so as to be divided from each other in the width direction of the vehicle (on left and right sides). The first battery box 14 and the second battery box 15 are formed by partitioning one container into two left and right spaces with respect to the longitudinal direction of a vehicle body, and are provided with lids 35 capable of opening and closing the battery boxes, respectively. The first battery 81 and the second battery 82 are contained in the first battery box 14 and the second battery box 15, respectively. In this case, the first battery 81 and the second battery 82 are connected to each other in series, and drive the first motor 7 and the second motor 4 as one battery 8. Further, the first battery 81 and the second battery 82 are charged by the first motor 7 and the second motor 4 that function as generators capable of regenerating during deceleration.

Figure 4:
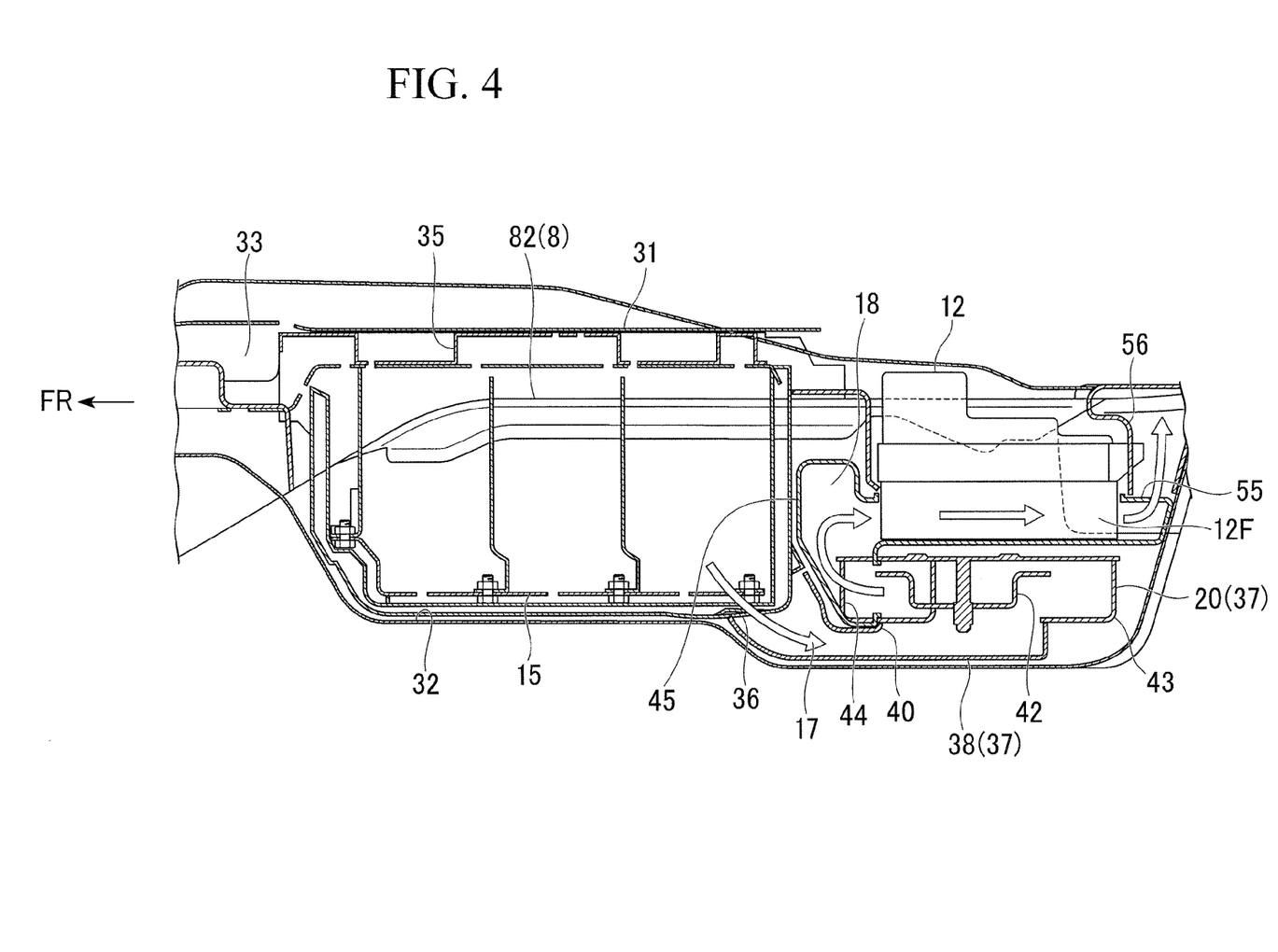
FIG. 4 is a cross-sectional view taken along a line X-X of FIG. 2.
Figure 5:
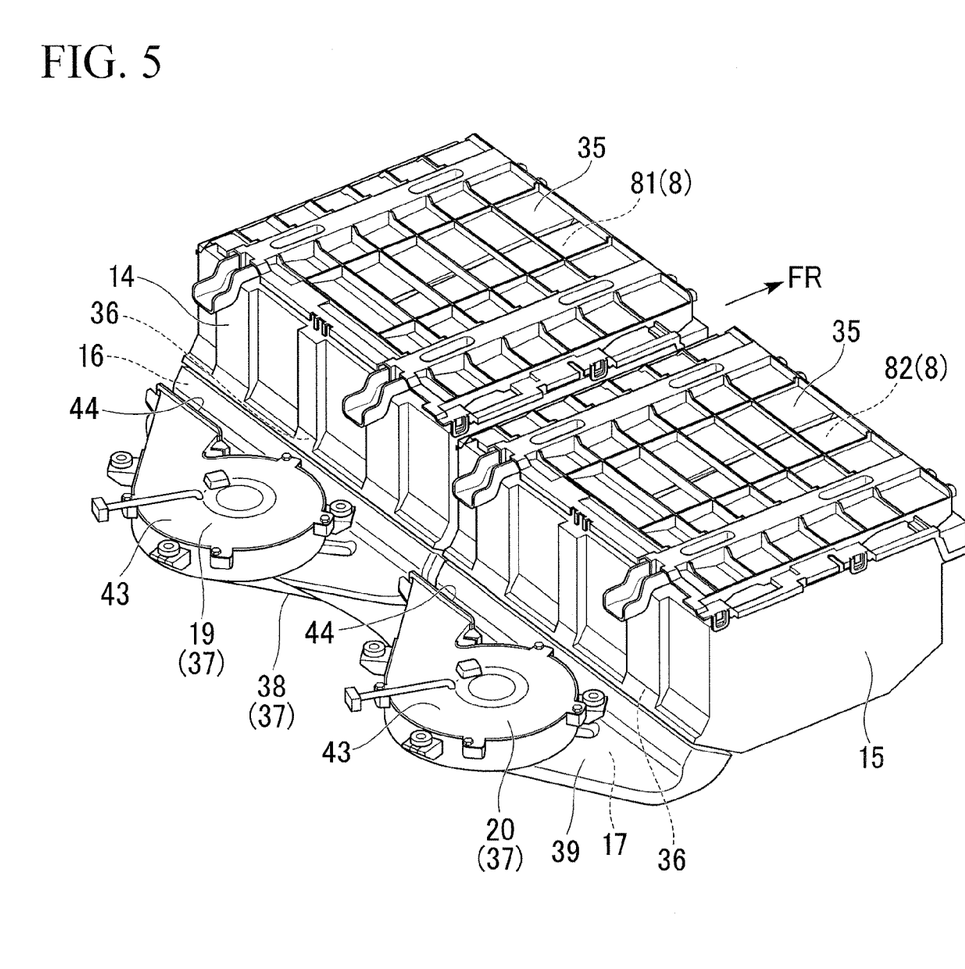
FIG. 5 is a perspective view of a battery box according to the embodiment and peripheral portions of the battery box.

As shown in FIGS. 4 and 5, openings 36 are formed at the lower rear portions of the first battery box 14 and the second battery box 15, respectively. A fan unit 37 is connected and communicates with the openings 36 so as to straddle them. The fan unit 37 is disposed on the rear bottom portion of the storage recess 32 of the rear floor 31.

The fan unit 37 is provided with a fan duct 38 therebelow. Two holes 40 are formed through the upper wall 39 of the fan duct 38. The first cooling fan 19 and the second cooling fan 20 are fixed to the two holes 40, respectively.

Figure 6:
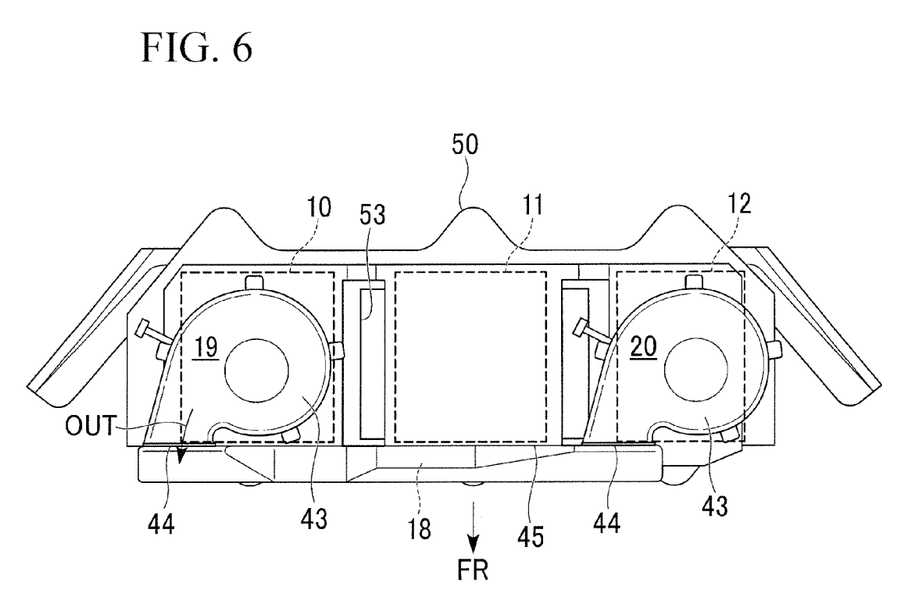
FIG. 6 is a perspective view of a PCU duct according to the embodiment, as seen from the lower side of both cooling fans.
Figure 7:
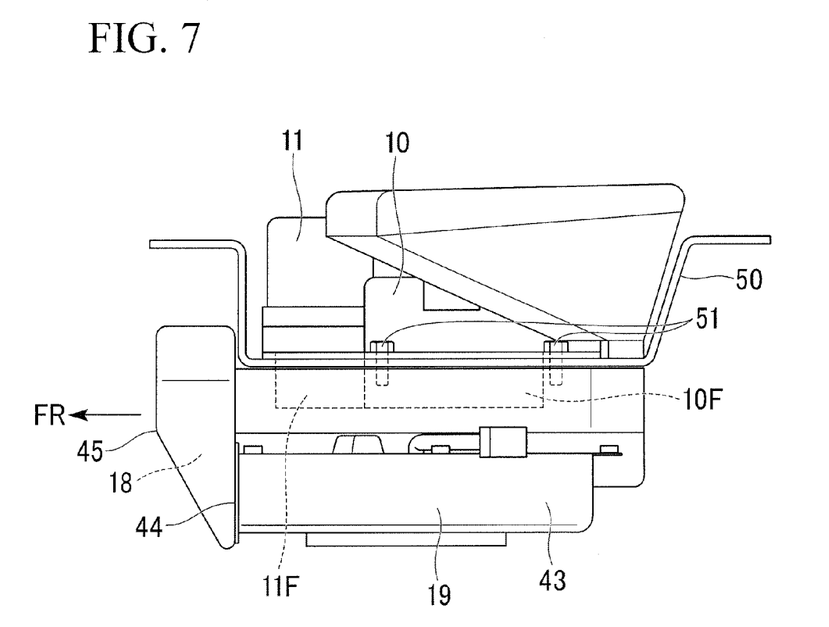
FIG. 7 is a perspective view of FIG. 6.
Figure 8:
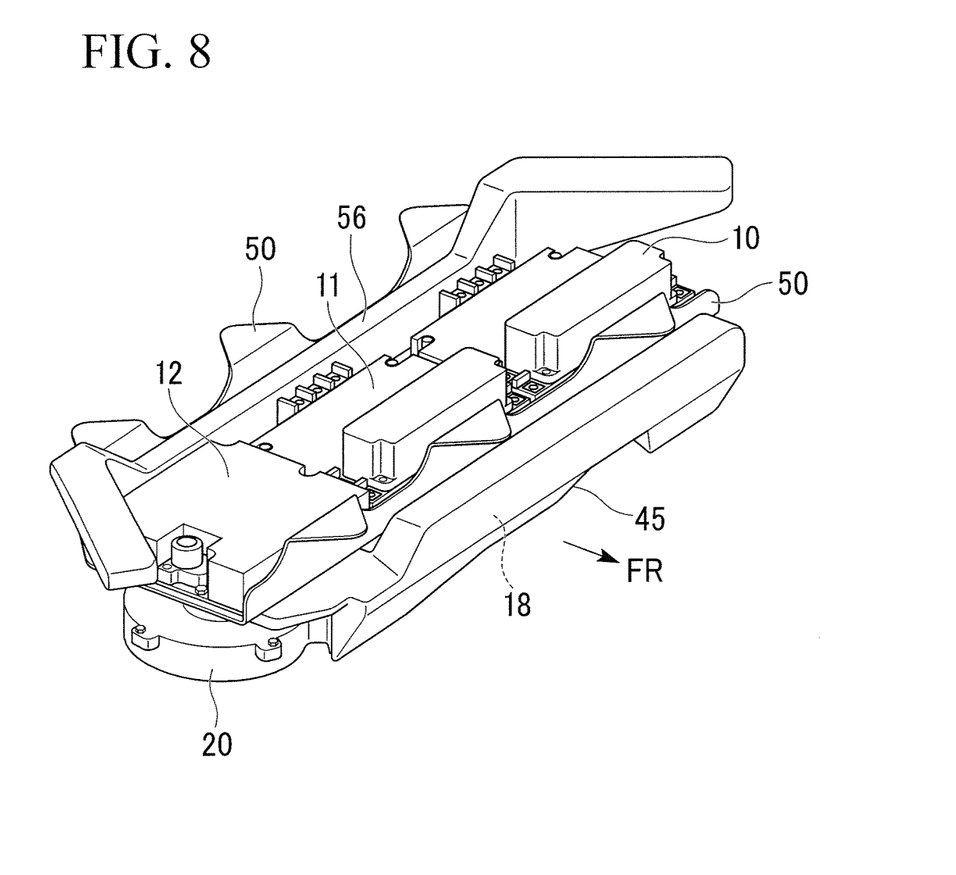
FIG. 8 is a perspective view of electrical units and the PCU duct according to the embodiment, as seen from the upper side.

As shown in FIGS. 6 to 8, the fan body 42 of each of the first cooling fan 19 and the second cooling fan 20 is covered with a casing 43. An outlet 44 facing the front side is formed in the casing 43, and a PCU duct 45 is disposed on the fan unit 37 so as to cover the outlet 44.

Figure 3:
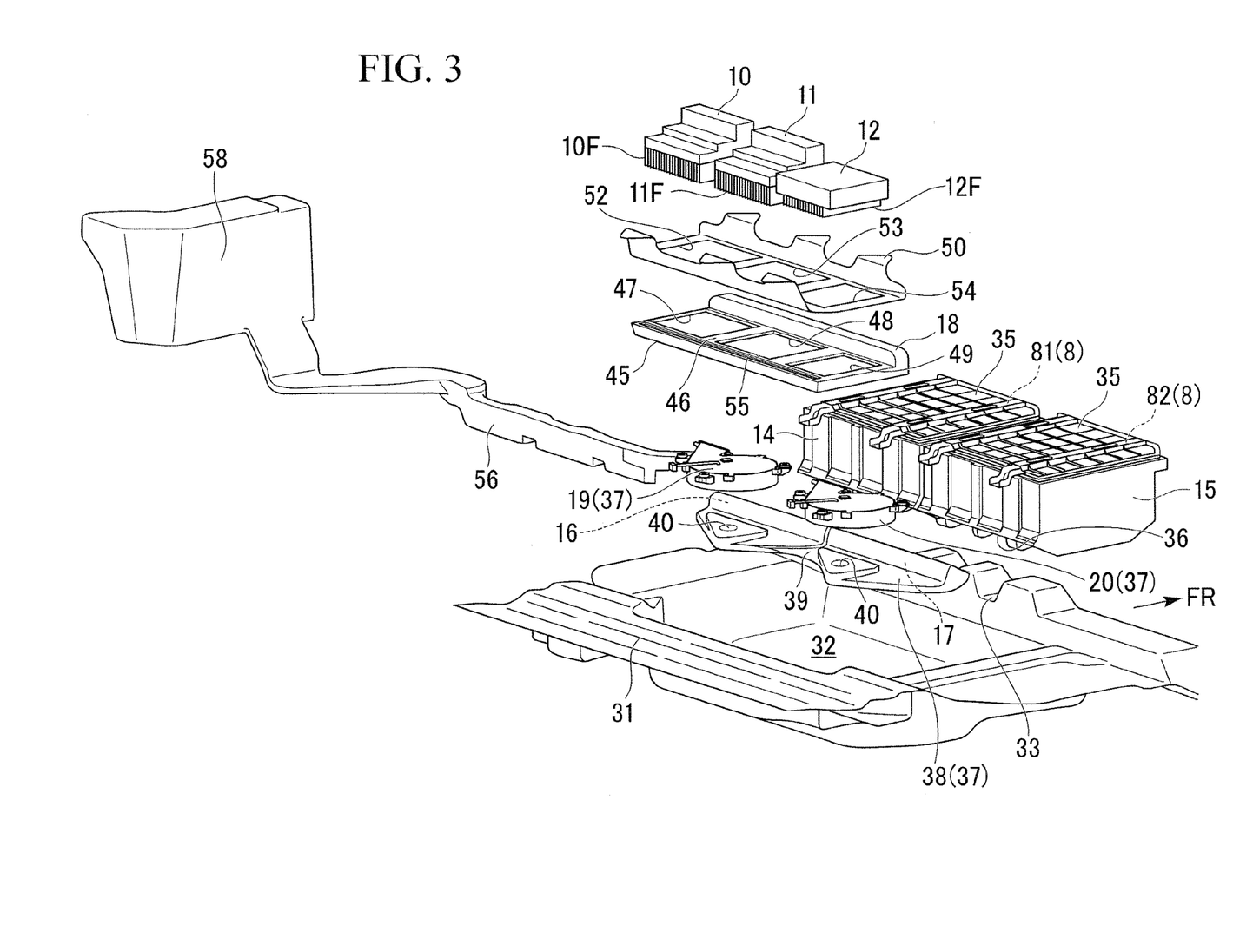
FIG. 3 is an exploded perspective view of main parts of FIG. 2.

The merging part 18, which covers the outlet 44 of each of the first cooling fan 19 and the second cooling fan 20 so as to allow air to flow together, is disposed in front of the PCU duct 45 in the width direction of the vehicle. As shown in FIG. 3, fin insertion holes 47, 48, and 49 for the first power drive unit 10, the second power drive unit 11, and the converter 12 are formed through the upper wall 46 of the PCU duct 45. Further, a plate-shaped PCU bracket 50 is placed on the PCU duct 45. The first power drive unit 10, the second power drive unit 11, and the converter 12 are fixed to the PCU bracket 50 by bolts 51.

Mounting holes 52, 53, and 54 for the first power drive unit 10, the second power drive unit 11, and the converter 12 are formed through the PCU bracket 50. The first power drive unit 10, the second power drive unit 11, and the converter 12 are fixed to the mounting holes 52, 53, and 54, respectively. The cooling fins 10F, 11F, and 12F of the first power drive unit 10, the second power drive unit 11, and the converter 12 are exposed to cooling air by exposing the fins to the inside of the PCU duct 45 through the fin insertion holes 47, 48, and 49 (see FIG. 3) of the PCU duct 45. Accordingly, the first power drive unit 10, the second power drive unit 11, and the converter 12 are cooled.

Further, the first power drive unit 10, the second power drive unit 11, and the converter 12 are provided with the cooling fins 10F, 11F, and 12F corresponding to the amount of heat generated therefrom, respectively. The area of each of the cooling fins 10F, 11F, and 12F is set depending on the amount of heat generated. Specifically, the area ratio of the fins is adjusted so as to correspond to the amount of generated heat by setting the number of sheets, the length, and the width of the cooling fins 10F, 11F, and 12F.

An opening 55 is formed through the rear upper wall of the PCU duct 45. A collecting duct 56 is connected to the opening 55 in the width direction of the vehicle. The collecting duct 56 is connected and communicates with a silencer 58 that is connected to a left wheelhouse inner 57 of the vehicle body. The silencer 58 is connected to a vent (not shown) formed through a vehicle body panel.

Figure 9:
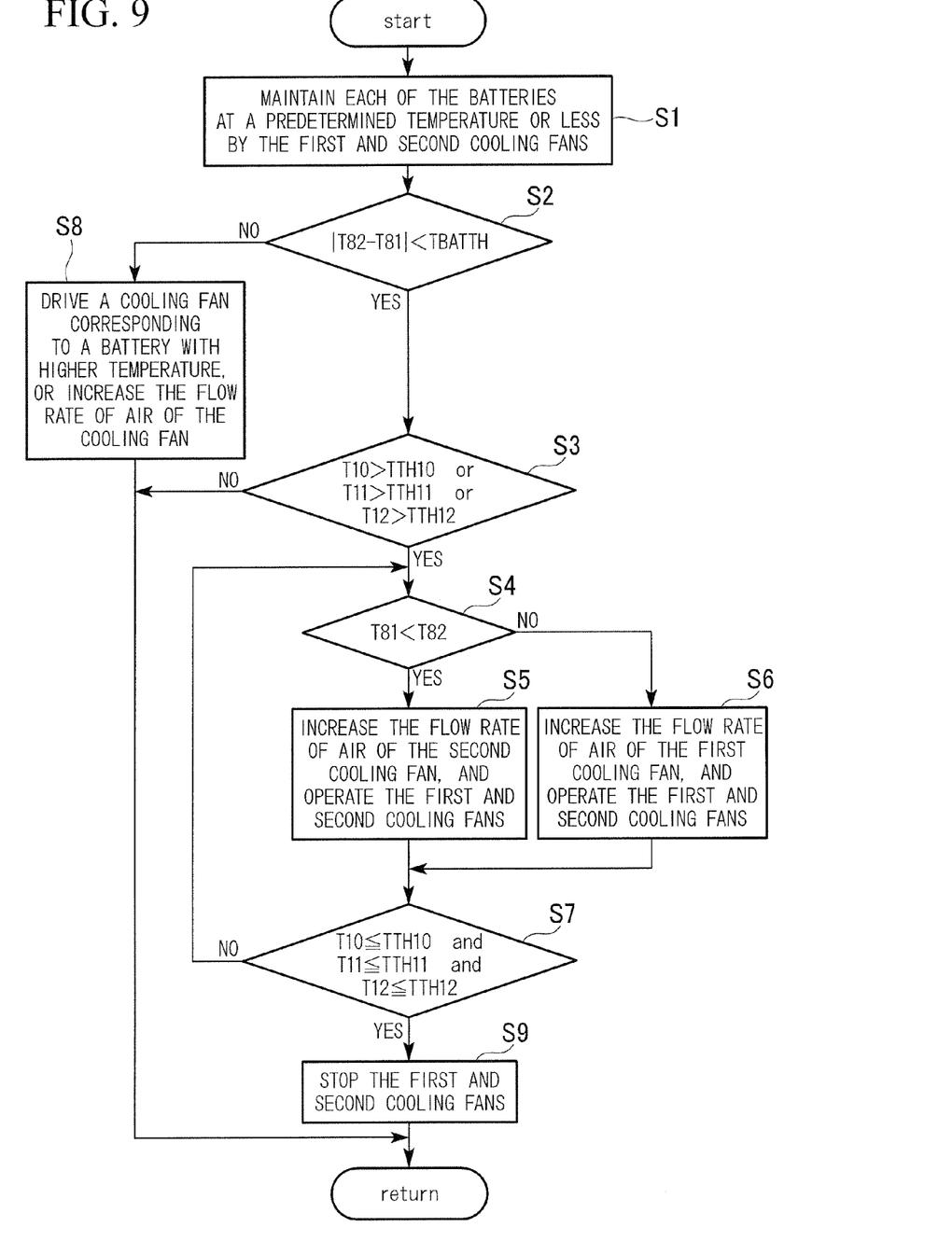
FIG. 9 is a flowchart illustrating cooling control using both cooling fans according to the embodiment.

The control of the cooling fans will be described below with reference to a flowchart of FIG. 9.

In Step S1, the first battery 81 and the second battery 82 are maintained at a predetermined temperature by the first cooling fan 19 and the second cooling fan 20. That is, cooling control is performed by the first cooling fan 19 and the second cooling fan 20 so that the temperature of each of the batteries does not reach a predetermined temperature. Meanwhile, if the temperature of each of the first battery 81 and the second battery 82 is equal to or lower than the predetermined temperature, the cooling control using the first cooling fan 19 and the second cooling fan 20 is not performed.

Subsequently, in Step S2, it is determined whether the absolute value of the difference between the temperature T82 of the second battery 82 and the temperature T81 of the first battery 81 is smaller than the threshold value TBATTH of the temperature difference between the batteries.

As a result of the determination in Step S2, if the absolute value (|T82−T81|) of the difference between the temperature T82 of the second battery 82 and the temperature T81 of the first battery 81 is smaller than the threshold value TBATTH (for example, 20° C.) of the temperature difference between the batteries, the procedure proceeds to Step S3. In contrast, if the absolute value of the difference between the temperature T82 of the second battery 82 and the temperature T81 of the first battery 81 is equal to or larger than the threshold value TBATTH of the temperature difference between the batteries, the procedure proceeds to Step S8.

In Step S8, in order to remove the temperature difference between the batteries and ensure the equal charge conditions, a cooling fan corresponding to a battery with higher temperature is driven or the flow rate of air of the cooling fan is increased if the cooling fan corresponding to the battery with higher temperature has been already driven. After that, the flow of FIG. 9 is repeated.

On the other hand, in Step S3, it is determined whether or not any one of the temperature T10 of the first power drive unit 10, the temperature T11 of the second power drive unit 11, and the temperature T12 of the converter 12 is higher than each of the threshold value TTH10, the threshold value TTH11, and the threshold value TTH12. If the result of the determination in Step S3 is "NO", the above-mentioned processes are repeated. If the result of the determination in Step S3 is "YES", the procedure proceeds to Step S4.

In Step S4, it is determined whether the temperature T82 of the second battery 82 is higher than the temperature T81 of the first battery 81. If the result of the determination in Step S4 is "YES", that is, the temperature of the second battery 82 is higher than the temperature of the first battery, the procedure proceeds to Step S5.

In Step S5, the cooling fans are operated so that the flow rate of air of the second cooling fan 20 is larger than that of the first cooling fan 19 and the temperature difference between the batteries is smaller than the threshold value TBATTH. The first power drive unit 10, the second power drive unit 11, or the converter 12, which is provided on the downstream side of the merging part and needs to be cooled, is cooled by cooling air that flows into the merging part 18 due to the above-mentioned operation. Then, the procedure proceeds to Step S7.

On the other hand, if the result of the determination in Step S4 is "NO", that is, the temperature of the first battery 81 is higher than that of the second battery, the procedure proceeds to Step S6.

In Step S6, the cooling fans are operated so that the flow rate of air of the first cooling fan 19 is larger than that of the second cooling fan 20 and the temperature difference between the batteries is smaller than the threshold value TBATTH. The first power drive unit 10, the second power drive unit 11, or the converter 12, which is provided on the downstream side of the merging part and needs to be cooled, is cooled by cooling air that flows into the merging part 18 due to the above-mentioned operation. Then, the procedure proceeds to Step S7.

Note that, in Steps S5 and S6, each flow rate of air of the cooling fans is set depending on the temperature of the first power drive unit 10, the second power drive unit 11, or the converter 12 that needs to be cooled. For example, each flow rate of air of the cooling fans is set by retrieving it from a MAP. The greater the difference between the temperature of the equipment to be cooled and the threshold value becomes, the larger the required flow rate of air becomes.

In Step S7, it is determined whether or not all of the temperature T10 of the first power drive unit 10, the temperature T11 of the second power drive unit 11, and the temperature T12 of the converter 12 are equal to or lower than each of the threshold value TTH10, the threshold value TTH11, and the threshold value TTH12.

The result of the determination in Step S7 is "YES", that is, all of the temperature T10 of the first power drive unit 10, the temperature T11 of the second power drive unit 11, and the temperature T12 of the converter 12 are equal to or lower than each of the threshold value TTH10, the threshold value TTH11, and the threshold value TTH12, the first cooling fan 19 and the second cooling fan 20 are stopped in Step S9 and the above-mentioned processes are repeated again.

The result of the determination in Step S7 is "NO", the procedure proceeds to Step S4.

According to the above-mentioned embodiment, the first cooling fan 19 and the second cooling fan 20 for cooling the first battery 81 and the second battery 82 are independently provided in the first battery box 14 and the second battery box 15. Accordingly, cooling air, which has cooled the first battery 81 and the second battery 82 to an optimum temperature, is merged at the merging part 18, and can make the temperature T10 of the first power drive unit 10, the temperature T11 of the second power drive unit 11, and the temperature T12 of the converter 12 be equal to or lower than each of the threshold value TTH10, the threshold value TTH11, and the threshold value TTH12. As a result, while the first battery 81 and the second battery 82 display sufficient performance, it is possible to cool the first power drive unit 10, the second power drive unit 11, and the converter 12.

The first cooling fan 19 and the second cooling fan 20 are provided in the cooling passages 16 and 17 of the first battery box 14 and the second battery box 15, respectively. Therefore, it is possible to reliably cool the first battery 81 and the second battery 82 in the first battery box 14 and the second battery box 15. As a result, it is possible to maintain the temperature condition of the battery 8, of which output performance significantly depends on temperature, at optimum conditions.

Further, the first cooling fan 19 and the second cooling fan 20 are provided in the vicinity of the merging part 18, more specifically, in the vicinity of the upstream side of the merging part 18. Therefore, even though the flow rates of cooling air at the first battery 81 and the second battery 82 are different from each other, it is possible to make the flow rate of cooling air be uniform at the merging part 18 by the first cooling fan 19 and the second cooling fan 20. It is possible to use the cooling air to cool the first power drive unit 10, the second power drive unit 11, and the converter 12. As a result, it is possible to effectively cool the first power drive unit 10, the second power drive unit 11, and the converter 12.

When the first power drive unit 10, the second power drive unit 11, or the converter 12 needs to be cooled, the first cooling fan 19 and the second cooling fan 20 of the first battery box 14 and the second battery box 15 are controlled and operated so that the difference (|T82−T81|) between the temperature T82 of the second battery 82 and the temperature T81 of the first battery 81 is smaller than the threshold value TBATTH of the temperature difference between the batteries. It is possible to cool the first power drive unit 10, the second power drive unit 11, and the converter 12, which are provided on the downstream side of the merging part and need to be cooled, by cooling air that flows into the merging part 18 due to the operation of the first cooling fan 19 and the second cooling fan 20. As a result, it is possible to minimize electric power used to drive the first cooling fan 19 and the second cooling fan 20.

A specific example will be described below with reference to FIG. 10.

In the structure including the merging part 18 like this embodiment, the flow rate of cooling air flowing through the merging part 18 is the sum of the flow rates of air generated by the first cooling fan 19 and the second cooling fan 20 that are each used to make the temperature difference between the first battery 81 and the second battery 82 be smaller than a predetermined value. For example, if the flow rate of air of the first cooling fan 19 of 78 m$^3$/h ("a" in FIG. 10) and the flow rate of air of the second cooling fan 20 of 58 m$^3$/h ("b" in FIG. 10) are ensured, it is possible to ensure the flow rate of air of 136 m$^3$/h, which is used to cool the first power drive unit 10, the second power drive unit 11, and the converter 12.

Accordingly, it is possible to minimize the flow rate of air of the first cooling fan 19 and the second cooling fan 20. Further, it is possible to minimize the influence on air conditioning performance through the operation of the first cooling fan 19 and the second cooling fan 20 that perform cooling with air for air conditioning.

Meanwhile, in the case where: a merging part is not provided; first and second cooling fans are provided in cooling passages in which a battery is divided and disposed; and electrical units are separately disposed in the cooling passages, when the temperature of one electrical unit rises and the electrical unit thus needs to be cooled, the electrical unit is cooled by the cooling fan provided in the cooling passage, such as the first cooling fan, in which the electrical unit is located. When the required flow rate of air is intended to be provided by only one cooling fan as described above, the rotation rate of the fan should be increased. Further, if the first cooling fan is operated in this way, the corresponding first battery is also cooled. For this reason, the temperature of the first battery becomes lower than the temperature of the second battery. That is, since the temperature difference occurs between the first and second batteries, the equal charge conditions of the batteries may deteriorate. In order to prevent this, even though the electrical unit corresponding to the second cooling fan does not need to be cooled, the second cooling fan needs to be operated to cool the second battery for the purpose of the removal of the temperature difference between the batteries.

Figure 10:
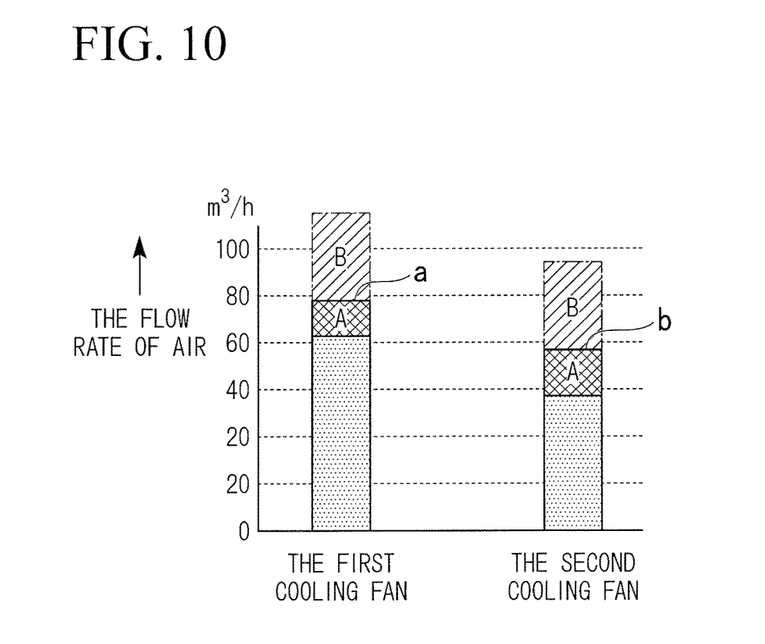
FIG. 10 is a graph showing advantageous effect of the cooling structure according to the embodiment in comparison with that according to the conventional art.

As a result, as shown in FIG. 10, in the cooling structure without a merging part, it is necessary to ensure the extra flow rate of air corresponding to the drive of the second cooling fan for the purpose of the removal of the temperature difference between the batteries (it is necessary to ensure the increase of two cross-hatched portions B) since the electrical unit can be cooled with a smaller flow rate of air (the increase of only two cross-hatched portions A) according to the embodiment. That is, more electric power is consumed for cooling the electrical unit in the cooling structure without a merging part.

In contrast, according to the cooling structure of this embodiment, since it is possible to minimize the flow rate of air of the first cooling fan 19 and the second cooling fan 20, it is possible to reduce electric power consumption and to maintain the level of quietness in the vehicle cabin.

The invention is not limited to the above-mentioned embodiment. For example, the vehicle is not limited to a hybrid vehicle, and may also be applied to an electric vehicle or a fuel cell vehicle. Further, the temperature sensor has been described as an example of a temperature detector. However, various manners may be used as follows: if an object to be detected is the battery or the power drive unit, temperature may be estimated by using a voltage value and a current value. Alternatively, if an object to be detected is the converter, temperature may be estimated on the basis of voltage drop.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A cooling structure for cooling batteries and electrical units of a motor mounted in a vehicle, the cooling structure comprising:
   a plurality of battery boxes that each contain one of the batteries and have an opening defined therein;
   a cooling fan provided for each battery box, the cooling fan being adapted to cool the corresponding battery box by generating a cooling air;
   a merging part that is connected to and communicates with the opening of each battery box, the merging part being adapted to merge the cooling air that flows from the opening of each battery box and;
   a duct provided on a downstream side of the merging part such that merged cooling air flows from the merging part through the duct, wherein the electrical units are exposed to the inside of the duct through insertion holes of the duct such that the electrical units are cooled down by the merged cooling air flowing through the duct, wherein the electrical units comprise a converter which converts electric power supplied from the batteries,
   wherein the merging part is located substantially opposite the battery boxes with respect to the cooling fans.

2. The cooling structure for batteries and electrical units according to claim 1, wherein each cooling fan is provided in the vicinity of the merging part.

3. The cooling structure for batteries and electrical units according to claim 1, wherein:
   each of the batteries and the electrical units is provided with a temperature detector;
   each of the temperature detectors detects a temperature of each of the batteries and the electrical units;
   when the temperature of at least one of the batteries and the electrical units exceeds a predetermined threshold value, the cooling fans are driven; and
   when the temperature of at least one of the electrical units exceeds the predetermined threshold value for that electrical unit, the cooling fans are driven to cool down the at least one of the electrical units by using the merged cooling air flowing through the duct while maintaining temperature difference between the batteries within a predetermined range.

4. The cooling structure according to claim 1, wherein each cooling fan is connected to and communicates with the opening of the corresponding battery box and the merging part.

5. The cooling structure according to claim 1, wherein a muffler is provided below a rear floor of one of the battery boxes.

6. The cooling structure for batteries and electrical units according to claim 1, wherein:
   each of the batteries and the electrical units is provided with a temperature detector;
   each of the temperature detectors being adapted to detect a temperature of each of the batteries and the electrical units;
   wherein the cooling fans are adapted to be driven when the temperature of at least one of the batteries and the electrical units exceeds a predetermined threshold value;
   wherein the cooling fans are adapted to cool the electrical units when the temperature of at least one of the electrical units exceeds a predetermined threshold value for that electrical unit, and
   wherein the cooling fans are adapted to be controlled while cooling the electrical units so that the temperature difference between the batteries is within a predetermined range.

7. The cooling structure for batteries and electrical units according to claim 1, comprising a plurality of cooling fins provided on a downstream side of the merging part.

8. The cooling structure for batteries and electrical units according to claim 1, wherein each of the batteries is provided with a temperature detector, and wherein the cooling fan of each battery box is configured to have a rotation rate based on an output of a corresponding temperature detector.

9. A cooling structure for cooling batteries and electrical units of a motor mounted in a vehicle, the cooling structure comprising:
   a plurality of battery boxes that each contain one of the batteries and have an opening defined therein;
   a cooling fan provided for each battery box, the cooling fan being adapted to cool the corresponding battery box by generating a cooling air;
   a merging part that is connected to and communicates with the opening of each battery box, the merging part being adapted to merge the cooling air that flows from the opening of each battery box and;
   a duct provided on a downstream side of the merging part such that merged cooling air flows from the merging part through the duct, wherein the electrical units are exposed to the inside of the duct through insertion holes of the duct such that the electrical units are cooled down by the merged cooling air flowing through the duct,
   wherein the merging part is located substantially opposite the battery boxes with respect to the cooling fans.

10. The cooling structure for batteries and electrical units according to claim 1, further comprising a fan controller configured to operate the cooling fans, and wherein
    each of the batteries and the electrical units is provided with a temperature detector,
    each of the temperature detectors detects a temperature of each of the batteries and the electrical units,
    the fan controller is configured to drive the cooling fans when the temperature of at least one of the batteries and the electrical units exceeds a predetermined threshold value, and when the temperature of at least one of the electrical units exceeds the predetermined threshold value for that electrical unit, the fan controller is configured to drive the cooling fans to cool down the at least one of the electrical units by using the merged cooling air flowing through the duct while maintaining temperature difference between the batteries within a predetermined range.

11. The cooling structure for cooling batteries and electrical units of a motor mounted in a vehicle according to claim 9 further comprising a fan controller configured to operate the cooling fans, and wherein each of the batteries and the electrical units is provided with a temperature detector, each of the temperature detectors detects a temperature of each of the batteries and the electrical units, the fan controller is configured to drive the cooling fans when the temperature of at least one of the batteries and the electrical units exceeds a predetermined threshold value, and when the temperature of at least one of the electrical units exceeds the predetermined threshold value for that electrical unit, the fan controller is configured to drive the cooling fans to cool down the at least one of the electrical units by using the merged cooling air flowing through the duct while maintaining temperature difference between the batteries within a predetermined range.

\* \* \* \* \*